(12) United States Patent
Nagashima et al.

(10) Patent No.: US 7,633,695 B2
(45) Date of Patent: Dec. 15, 2009

(54) MEDIUM SCAN METHOD FOR USE IN DISK DEVICE

(75) Inventors: Yasuyuki Nagashima, Kawasaki (JP); Keiichi Yorimitsu, Kawasaki (JP); Kiyotaka Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 11/454,661

(22) Filed: Jun. 16, 2006

(65) Prior Publication Data
US 2007/0211363 A1   Sep. 13, 2007

(30) Foreign Application Priority Data
Mar. 13, 2006   (JP)   ............... 2006-067310

(51) Int. Cl.
*G11B 27/36* (2006.01)

(52) U.S. Cl. ........................................ 360/31

(58) Field of Classification Search ............ 360/69, 360/77.02, 78.04, 31, 53; 711/114, 162, 711/112; 714/807, 8, 6, 47, 719; 710/1; 707/204
See application file for complete search history.

(56) References Cited

U.S. PATENT DOCUMENTS

| | | | | |
|---|---|---|---|---|
| 6,295,619 B1 * | 9/2001 | Hasbun et al. | ............... | 714/719 |
| 6,594,743 B1 * | 7/2003 | Chen et al. | ................... | 711/162 |
| 7,155,587 B2 * | 12/2006 | Eguchi et al. | ............... | 711/162 |
| 7,177,979 B2 * | 2/2007 | Kuwamura | ................. | 711/112 |
| 7,191,367 B2 * | 3/2007 | Ito et al. | ....................... | 714/47 |
| 7,216,199 B2 * | 5/2007 | Mizuno | ....................... | 711/114 |
| 2003/0023933 A1 * | 1/2003 | Duncan | ....................... | 714/807 |
| 2004/0047062 A1 | 3/2004 | Alex | | |
| 2004/0193798 A1 | 9/2004 | Kuwamura | | |
| 2005/0138223 A1 * | 6/2005 | Clifton et al. | ................... | 710/1 |
| 2005/0168859 A1 | 8/2005 | Cho et al. | | |
| 2005/0262400 A1 | 11/2005 | Nadeau et al. | | |
| 2006/0143446 A1 * | 6/2006 | Frank et al. | ................. | 713/164 |
| 2006/0156059 A1 * | 7/2006 | Kitamura | ....................... | 714/6 |
| 2006/0179215 A1 * | 8/2006 | Mochizuki et al. | .......... | 711/112 |
| 2006/0179217 A1 * | 8/2006 | Ito et al. | ..................... | 711/112 |
| 2007/0035868 A1 * | 2/2007 | van Zyl | ....................... | 360/69 |
| 2007/0130234 A1 * | 6/2007 | Ikegaya et al. | .............. | 707/204 |
| 2007/0174678 A1 * | 7/2007 | King | ............................. | 714/8 |

FOREIGN PATENT DOCUMENTS

| | | |
|---|---|---|
| JP | 58-182775 | 10/1983 |
| JP | 04-205972 | 7/1992 |
| JP | 2001-110004 | 4/2001 |
| JP | 2004-273060 | 9/2004 |
| JP | 2005-190003 | 7/2005 |
| JP | 2005-216476 | 8/2005 |
| JP | 2005-322399 | 11/2005 |

* cited by examiner

*Primary Examiner*—Fred Tzeng
(74) *Attorney, Agent, or Firm*—Greer, Burns & Crain, Ltd.

(57) ABSTRACT

To provide a medium scan method which can be executed for a suitable region at suitable timing, a disk device comprises a storage medium for storing information, a writing unit for writing information to the storage medium by request from an upper device such as a host computer or the like, a medium monitoring unit for monitoring the state of the storage medium, and a medium scan determining unit for determining whether or not to require medium scan for the storage medium.

15 Claims, 17 Drawing Sheets

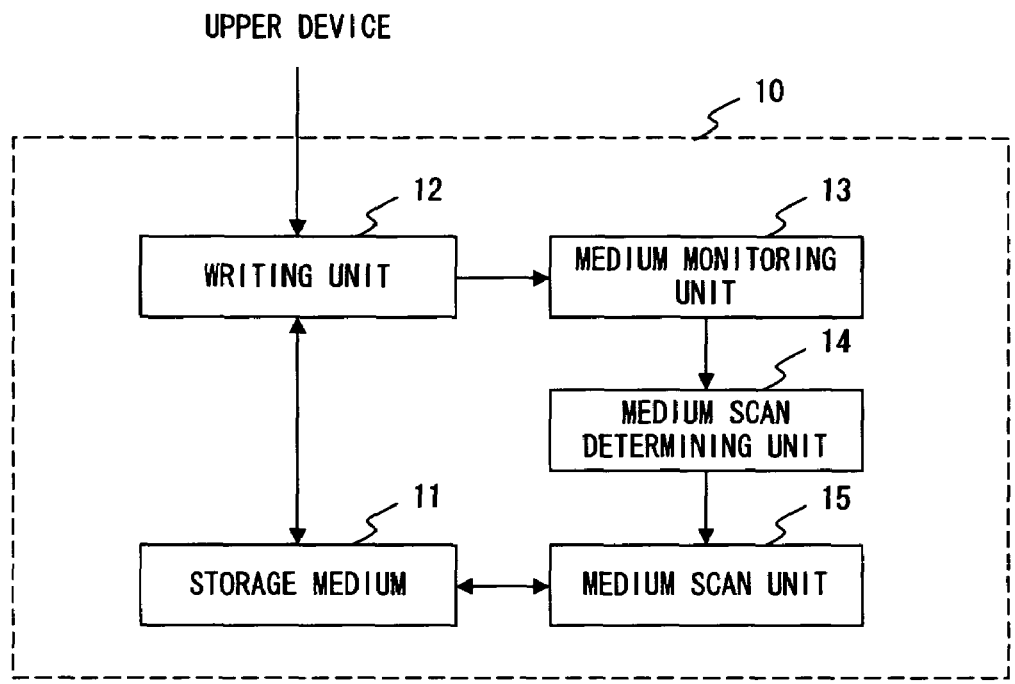
F I G. 1

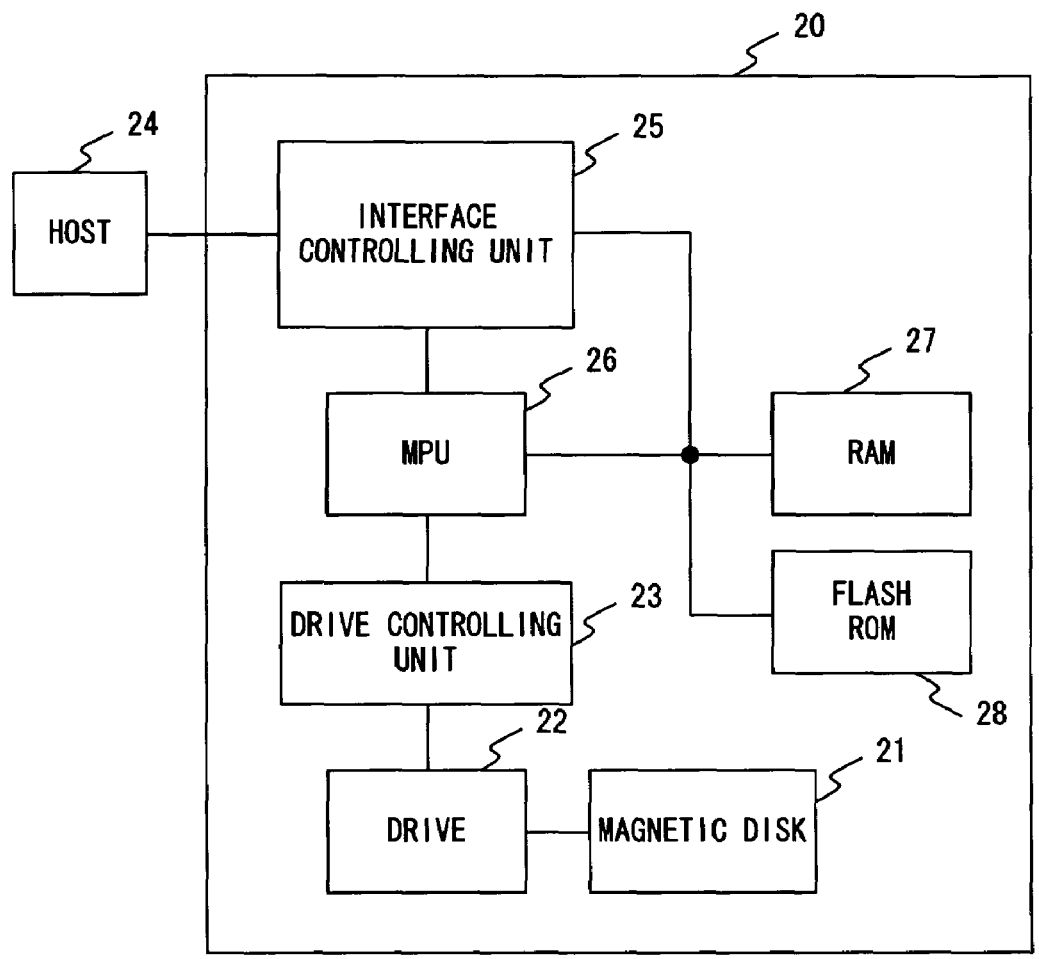
F I G. 2

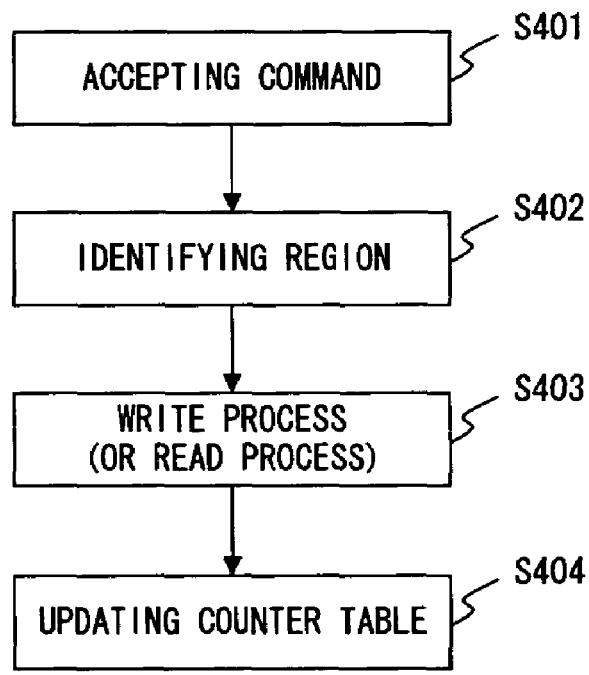
F I G. 4

| PARTITION | 0 | 1 | 2 | .... | n | ... | 85 |
|---|---|---|---|---|---|---|---|
| MAGNETIC HEAD 0 | P0 (1) | P8 | P16 | .... .... | .... | ... ... | P680 |
| MAGNETIC HEAD 1 | P1 | P9 | P17 (1) | .... .... | .... | ... ... | P681 |
| ⋮ | | | | .... | .... | ... | |
| MAGNETIC HEAD 7 | P7 | P15 | P23 | .... .... | Pm (2) | ... ... | P687 |

※ NUMERAL ENCLOSED WITH () IN BOTTOM ROW OF EACH REGION INDICATES NUMBER OF TIMES THAT TARGET COMMAND IS RECEIVED

F I G. 7

| PARTITION | 0 | 1 | 2 | .... | n | ... | 85 |
|---|---|---|---|---|---|---|---|
| MAGNETIC HEAD 0 | P0 | P8 | P16 | .... | .... | ... | P680 |
|  | (1) |  | (1) | .... | .... | ... |  |
| MAGNETIC HEAD 1 | P1 | P9 | P17 | .... | .... | ... | P681 |
|  | (5) | (8) | (3) | .... | .... | ... |  |
| ⋮ |  |  |  | .... | .... | ... |  |
| MAGNETIC HEAD 7 | P7 | P15 | P23 | .... | Pm | ... | P687 |
|  | (1) |  |  | .... | (11) | ... | (6) |

※ NUMERAL ENCLOSED WITH () IN BOTTOM ROW OF EACH REGION INDICATES NUMBER OF TIMES THAT TARGET COMMAND IS RECEIVED

F I G. 8

| PARTITION | 0 | 1 | 2 | .... | n | ... | 85 |
|---|---|---|---|---|---|---|---|
| MAGNETIC HEAD 0 | P0 | P8 | P16 | .... | .... | ... | P680 |
|  | (1) | (1) | .... | .... | ... | (9) |
| MAGNETIC HEAD 1 | P1 | P9 | P17 | .... | .... | ... | P681 |
|  | (5) | (8) | (11) | .... | .... | ... |  |
| ⋮ |  |  |  | .... | .... | ... |  |
| MAGNETIC HEAD 7 | P7 | P15 | P23 | .... | Pm | ... | P687 |
|  |  | (1) |  | .... | (15) | ... | (6) |

※ NUMERAL ENCLOSED WITH ( ) IN BOTTOM ROW OF EACH REGION INDICATES NUMBER OF TIMES THAT TARGET COMMAND IS RECEIVED

FIG. 9

MEDIUM SCAN METHOD FOR USE IN DISK DEVICE

BACKGROUND OF THE INVENTION

1. Field of the Invention

The present invention relates to a medium scan method for monitoring information written to a medium surface in a preventive and maintainable manner in a disk device which executes a read/write process of information to/from a medium surface by request from an upper device such as a host computer or the like.

2. Description of the Related Art

There may be cases where a disk device such as a magnetic disk device, which writes/reads to/from a medium surface data transmitted from an upper device such as a host computer or the like and transmits the data to the upper device, cannot maintain the original quality of the data because of a disturbance (such as the attenuation of a data signal due to an influence of leakage flux at the time of a write to a contiguous region, a partial crush of contiguous data due to device vibrations, or the like) or a change by a time elapsing.

For example, there is a problem such that if an unrestorable data check or a restorable data check, and a sector replacement process accompanying the check occur when attempts are made to actually read data from a sector to which data is successfully written, an upper device comes under a significant influence such as a decrease in a processing speed or the like.

Such problems have become obvious as the recording density (BPI: a density in a recording direction (circumferential direction), and TPI: a density between recording tracks (in a diameter direction)) of a medium surface improves with a recent increase in the storage capacity of a disk device, leading to a large obstacle to the quality of the disk device.

Therefore, a function for reading/verifying the entire surface of a medium at predetermined time intervals while a disk device is idle has been popularized as a function for assuring data on the medium surface beforehand.

Namely, the medium surface is internally read while the disk device is idle, and (1) if a sector which causes an unrestorable read error is detected, it is recorded as log data, or (2) data is rewritten to a sector which causes a restorable read error.

As a result, a temporary read error or head noise, an influence exerted by leakage flux at the time of a write to a contiguous track, partial damage caused by a vibrated write can be possibly relieved. Additionally, a restorable sector can be prevented from being degraded to unrestorable state before the degradation occurs.

Furthermore, (3) if an error occurs even in a read remade after the rewrite in (2), this can be a true fault of the medium. In this case, a sector replacement process is executed if possible.

The above described processes are generally called background medium scan, etc., and its specifications are actually proposed by ANSI (American National Standard Institute).

However, the conventional background medium scan (hereinafter referred to as medium scan) is made for the entire recording region of a disk device at predetermined time intervals. Therefore, it cannot flexibly cope with read/write processes executed by diverse requests from an upper device. For example, the following cases are considered.

(1) Case Where Writes Concentrate on a Specific Cylinder Head Sector

To reduce ill effects such as side erase caused by writes which frequently occur to a specific region, read scan for a contiguous region must be started at a time when definite writes concentrate on a definite region. However, with the conventional medium scan, an entire region is always targeted to be scanned without being dependent on an access pattern.

(2) Case Where Writes to a Specific Cylinder Head Sector Occur in a Short Time

If writes frequently occur to a specific region in a short time, scan must be started at a time of exceeding a specific threshold time. However, the conventional medium scan is always made at predetermined time intervals without being dependent on the time of exceeding a threshold.

Japanese Patent Publication No. SHO58-182775 discloses a self-diagnosis method for use in a magnetic disk device, which can check an arbitrary region on a magnetic disk in an idle state.

Additionally, Japanese Patent Publication No. HEI04-205972 discloses a magnetic disk device which can make a reliable diagnosis in a short time.

Furthermore, Japanese Patent Publication No. 2005-190003 discloses a hard disk drive, an information processing device, a disk controlling device, and a diagnosis method for a hard disk drive.

Still further, Japanese Patent Publication No. 2005-322399 discloses an error state processing method and device for restoring a track squeeze fault, etc. of a magnetic disk drive used in a storage device system of large capacity.

SUMMARY OF THE INVENTION

The present invention was developed in consideration of the above described problems, and an object thereof is to provide a medium scan method which can be executed for a suitable region at suitable timing.

To overcome the above described problems, a disk device according to the present invention, which executes a write process for writing to a storage medium information transmitted from an upper device by request from the upper device, comprises a medium monitoring unit for monitoring the state of the storage medium to which the information is written by the write process, a medium scan determining unit for determining whether or not to require medium scan according to the state of the storage medium, and a medium scan unit for making medium scan for a storage medium for which the medium scan determining unit determines to require the medium scan.

According to the present invention, the state of a storage medium to which information is written by a write process is monitored, and whether or not to require medium scan is determined according to the state of the storage medium. Then, the medium scan is made for a medium for which the medium scan is determined to be required. Namely, timing at which the medium scan is to be made, and a region for which the medium scan is to be made are determined according to the state of a storage medium, and the medium scan is made for the determined region, whereby the medium scan can be made for a suitable region at suitable timing.

Additionally, a medium scan method according to the present invention, which is a medium scan method for use in a disk device that executes a write process for writing to a storage medium information transmitted from an upper device by request from the upper device, comprises: causing the disk device to execute a medium monitoring process for monitoring the state of the storage medium to which the information is written by the write process; causing the disk device to execute a medium scan determining process for determining whether or not to require medium scan according to the state of the storage medium; and causing the disk device to execute a medium scan process for making the medium scan for a storage medium for which the medium scan is determined to be required by the medium scan determining process. The medium scan method also produces a similar effect.

As described above, according to the present invention, the medium scan method which can be executed for a suitable region at suitable timing can be provided.

BRIEF DESCRIPTION OF THE DRAWINGS

FIG. 1 is a block diagram explaining the outline of a disk device according to a preferred embodiment of the present invention;

FIG. 2 is a block diagram exemplifying a configuration of the disk device according to the preferred embodiment of the present invention;

FIG. 4 is a flowchart showing a write process to a magnetic disk, according to the first preferred embodiment;

FIG. 7 is a schematic exemplifying the count-up of the counter table shown in FIG. 6;

FIG. 8 is a schematic exemplifying the count-up of the counter table shown in FIG. 6;

FIG. 9 is a schematic exemplifying the count-up of the counter table shown in FIG. 6;

DESCRIPTION OF THE PREFERRED EMBODIMENTS

Figure 3:
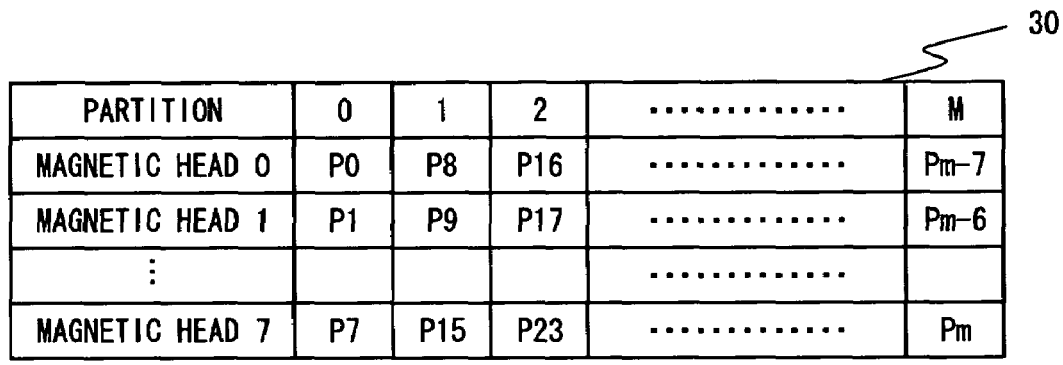
FIG. 3 is a schematic exemplifying a counter table used in a first preferred embodiment.

Preferred embodiments according to the present invention are hereinafter described with reference to FIGS. 1 to 17.

FIG. 1 is a block diagram explaining the outline of a disk device 10 according to a preferred embodiment of the present invention.

The disk device 10 according to this preferred embodiment comprises a storage medium 11 for storing information, a writing unit 12 for writing information to the storage medium 11 by request from an upper device such as a host computer or the like, a medium monitoring unit 13 for monitoring an access from the upper device to the storage medium 11 (namely, the state of the storage medium 11), a medium scan determining unit 14 for determining whether or not to require medium scan for the storage medium 11.

The writing unit 12 writes information to the storage medium 11 by request from the upper device such as a host computer or the like, and stores the information.

The medium monitoring unit 13 monitors the state of an access from the upper device to the storage medium 11 (namely, the state of the storage medium 11) by monitoring the write process to the storage medium 11, which is executed by the writing unit 12. For example, the medium monitoring unit 13 stores a region to which the writing unit 12 executes the write process, the number of times of the write process, etc., whereby the state of the storage medium is monitored.

The medium scan determining unit 14 determines whether or not to require medium scan according to the state of the storage medium 11 monitored by the medium monitoring unit 13, or a region for which the medium scan is required.

The medium scan unit 15 makes the medium scan for the storage medium 11 (or a predetermined region of the storage medium 11) for which the medium scan determining unit 14 determines to require the medium scan.

FIG. 2 is a block diagram exemplifying a configuration of the disk device 10 according to the preferred embodiment of the present invention.

A disk device 20 shown in FIG. 2 comprises a magnetic disk 21 for storing information, a drive 22 for driving the magnetic disk 21 for reading/writing desired data, a drive controlling unit 23 for controlling the drive 22, an interface controlling unit 25 for transmitting/receiving data between a host computer 24, which is an upper device, and the disk device 20, an MPU (Micro Processing Unit) 26 for controlling the constituent elements of the disk device 20 and for executing processes such as a write process for writing information to the magnetic disk 21 by request from the host computer 24, a RAM (Random Access Memory) 27 for reading from a FLASH ROM 28 information, a program and the like required for the operations of the MPU 26 and for temporarily storing the information, the program and the like, and the FLASH ROM 28 for storing the program and the like.

In the above described configuration, the medium monitoring unit, the medium scan determining unit, and the medium scan unit can be implemented in a way such that the MPU 26 executes the program stored in the RAM 27. Additionally, the storage medium 11 can be implemented with the magnetic disk 21.

The disk device 20 according to this preferred embodiment continually monitors whether or not a level at which medium scan is required is reached by monitoring the state of an access from the host computer, and immediately makes medium scan if the medium scan is determined to be required. This medium scan process is called intelligent background medium scan.

(1) First Preferred Embodiment

The first preferred embodiment according to the present invention is described below with reference to FIGS. 3 to 13.

In the first preferred embodiment, the magnetic disk 21 is segmented into small partitions, in each of which an access counter is provided for each head, whereby the state of an access (the state of the storage medium 11) from the host computer 24 to the magnetic disk 21 is segmented and monitored.

FIG. 3 is a schematic exemplifying a counter table 30 used in the first preferred embodiment.

The counter table 30 shown in FIG. 3 is a counter table having a counter value for each magnetic head of each of M partitions into which the entire cylinder of the magnetic disk 21 is segmented.

The following description assumes that the region of a partition 0/a magnetic head 0, the region of the partition 0/a magnetic head 1, . . . are P0, P1, . . . respectively.

FIG. 4 is a flowchart showing the write process to the magnetic disk 21, according to the first preferred embodiment.

In step S401, upon acceptance of a command from the host computer 24, the disk device 20 transfers the process to step S402.

In step S402, the command accepted in step S401 identifies a region to which data is to be written (or a region from which data is to be read). For example, a write command specifies a region to which data is to be written as follows: "WRITE (LBA (Logical Block Address) of a region at which a write starts) (the number of regional blocks to which a write is to be made)". Therefore, the region to which data is to be written can be identified according to (LBA of a region at which a write starts) and (the number of regional blocks to which a write is to be made).

In step S403, the disk device 20 executes a data write process (or read process) in accordance with the command accepted in step S401. Upon completion of the write process, the disk device 20 transfers the process to step S404.

In step S404, the disk device 20 checks whether or not the command accepted in step S401 is a command for commanding the write process to the magnetic disk 21.

If this command is for commanding the write process to the magnetic disk 21, the disk device 20 references the counter table 30 stored, for example, in the RAM 27. Then, the disk device 20 increments the counter values of regions P0 to Pm, which correspond to the region identified in step S402. After incrementing all of the counter values of the regions corresponding to the region identified in step S402, the disk device 20 terminates the process.

In this preferred embodiment, the process in step S404 (the access monitoring process) is executed for a command which executes the write process to the magnetic disk 21 in order to monitor an access from the host computer 24 to the magnetic disk 21. However, a command with which the process in step S404 is to be executed may be determined on demand.

Figure 5:
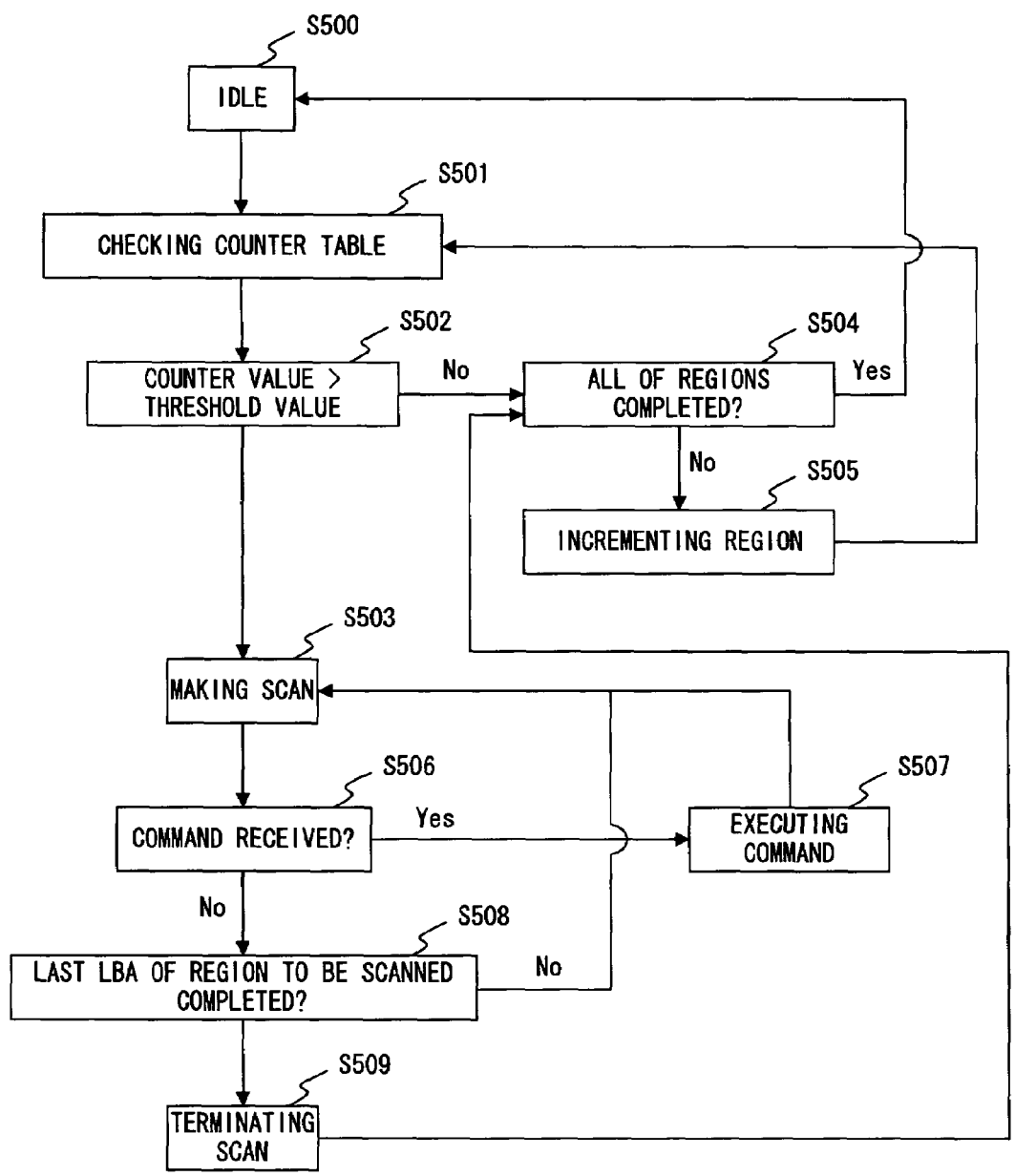
FIG. 5 is a flowchart showing a medium scan process according to the first preferred embodiment.

FIG. 5 is a flowchart showing the medium scan process according to the first preferred embodiment.

If a request is not made by the host computer 24, the disk device 20 enters an idle state (step S500). In this state, the disk device 20 executes no processes for the magnetic disk 21. When a predetermined time period elapses after the disk device 20 enters the idle state, the disk device 20 transfers the process to step S501.

In step S501, the disk device 20 references the counter table 30 stored in the RAM 27. Then, the disk device 20 obtains the counter value of the region P0. The region at this time is referred to as a current region hereinafter. In this preferred embodiment, the current region is sequentially incremented to P0, P1, P2, . . . , Pm in this order, and the processes in steps S501 through S509 are executed for each of the regions P0 through Pm.

In step S502, the disk device 20 makes a comparison between the counter value of the current region P0, which is obtained in step S501, and a threshold value (10 in this preferred embodiment). If the counter value of the current region P0 is larger than the threshold value, the disk device 20 transfers the process to step S503. Then, the disk device 20 makes the medium scan for the current region P0.

Or, if the counter value of the current region P0 is equal to or smaller than the threshold value, the disk device 20 transfers the process to step S504. Then, the disk device 20 determines whether or not the process in step S502 is executed for all of the regions P0 through Pm. If the process in step S502 is complete for all of the regions, the disk device 20 transfers the process to step S500.

Or, if the process in step S502 is not executed for any of the regions in step S504, the disk device 20 transfers the process to step S505. Then, the disk device 20 increments the current region P0 to P1.

After incrementing the current region, the disk device 20 refers to the counter table 30 by transferring the process to step S501, and obtains the counter value of the current region P1.

In the meantime, upon acceptance of the request from the host computer 24 during the medium scan made by the disk device 20 in step S503, the disk device 20 suspends the medium scan and transfers the process to step S506.

In step S506, the disk device 20 determines whether or not a command (such as a READ command or the like) is received from the host computer 24. If the command is received, the disk device 20 transfers the process to step S507, in which the disk device 20 executes the command. Upon completion of executing the command, the disk device 20 transfers the process to step S503, in which the disk device 20 resumes the suspended medium scan.

Or, if the command is not received in step S506, the disk device 20 transfers the process to step S508. Then, the disk device 20 checks whether or not the medium scan is complete up to the last LBA of the current region identified in step S501.

If the medium scan is not complete up to the last LBA of the current region in step S508, the disk device 20 transfers the process to step S503, in which the disk device 20 resumes the suspended medium scan.

Or, if the medium scan is complete up to the last LBA of the current region in step S508, the disk device 20 transfers the process to step S509 and terminates the medium scan for the current region. Then, the disk device 20 transfers the process to step S504.

Similarly, the processes in steps S501 through S509 are executed for all of the regions P0 through Pm.

Figure 6:
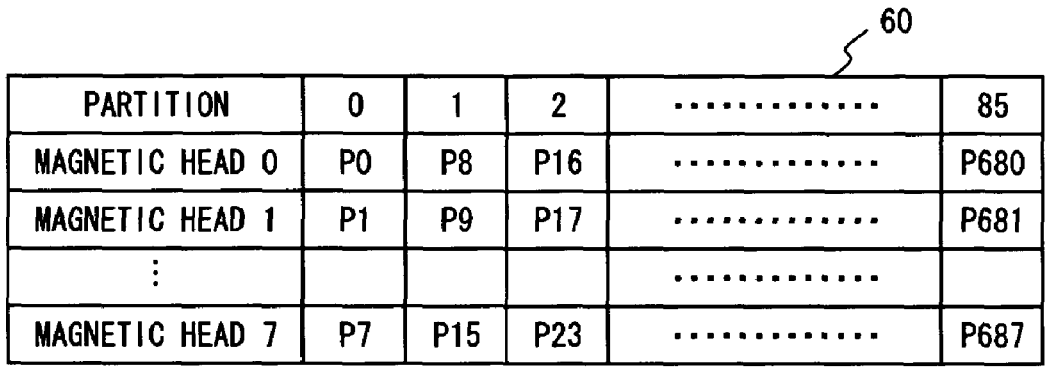
FIG. 6 is a schematic exemplifying a counter table according to the first preferred embodiment.

FIG. 6 is a schematic exemplifying the counter table 60 according to the first preferred embodiment.

A counter table 60 shown in FIG. 6 is a counter table used when the entire cylinder of the disk device comprising 8 magnetic heads is segmented into 86 partitions. Accordingly, the partitions range from 0 to 85. Additionally, since the magnetic heads range from 0 to 7, the storage region of the magnetic disk device is segmented into P0 to P687, and the counter table 60 has a counter value for each of the regions P0 through P687.

FIGS. 7 to 9 are schematics exemplifying the count-up of the counter table 60 shown in FIG. 6.

The counter table 60 shown in FIG. 7 exemplifies a case where the write process is executed once to the regions P0 and P17, and twice to the region Pm. Numerals enclosed with parentheses shown in this figure indicate counter values. The counter value of a region which is not enclosed with parentheses is 0.

The counter table 60 shown in FIG. 8 exemplifies a case where the counter value exceeds a threshold value. Since the counter value of the region Pm is 11, it exceeds the threshold value 10 according to this preferred embodiment.

The counter table 60 shown in FIG. 9 exemplifies a case where the counter values of a plurality of regions exceed the threshold value. Because the counter values of the regions P17 and Pm are 11 and 15 respectively, they exceed the threshold value 10 according to this preferred embodiment.

Figure 10:
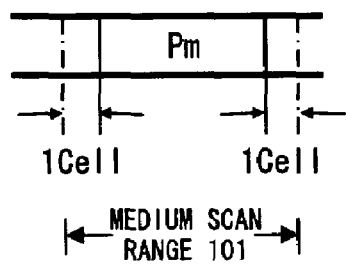
FIG. 10 is a schematic explaining a medium scan range for which medium scan is made if a counter value according to the first preferred embodiment exceeds a threshold value.
Figure 10:
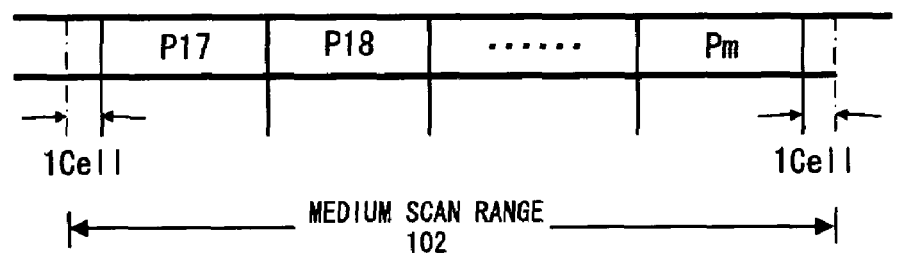

FIG. 10 is a schematic explaining a medium scan range for which the medium scan is made when a counter value exceeds the threshold value.

A medium scan range 101 indicates a medium scan range in the case of the counter table 60 shown in FIG. 8. In the counter table 60 shown in FIG. 8, the counter value of the region Pm exceeds the threshold value. In this case, the region Pm and regions of 1 cell, which precedes and succeeds the region PM, are defined to be a medium scan range.

1 cell is a minimum unit configuring each of the regions P0 to P687. For example, each of the regions P0 through P687 according to this preferred embodiment is configured with 32 cells.

Here, the medium scan according to this preferred embodiment is made only for a region the counter value of which in the counter table 60 exceeds the threshold value as shown in FIG. 5. However, for example, a medium scan range 102 shown in FIG. 10 may be determined with the processes in steps S501 and S502, and the medium scan processes in steps S503 through S509 may be executed for this medium scan range 102.

The medium scan range 102 exemplifies a medium scan range in the case of the counter table 60 shown in FIG. 9. In the counter table shown in FIG. 9, the counter values of the plurality of regions P17 and Pm exceed the threshold value. The medium scan range 102 is defined to be an entire region (regions P17, P18, . . . , Pm), which is sandwiched by the region P17 having the smallest regional number P17 and the region Pm having the largest regional number among the regions the counter value which exceeds the threshold value, and the regions of 1 cells preceding and succeeding the entire region.

Figure 11:
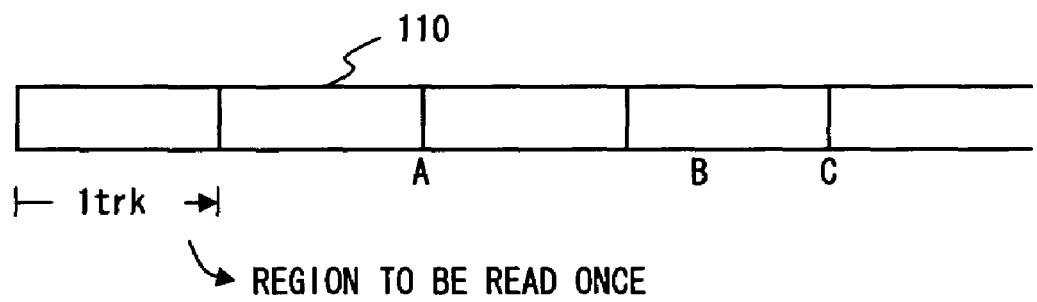
FIG. 11 is a schematic explaining a process executed when a command is received during medium scan.

FIG. 11 is a schematic explaining a process executed when a command is received during the medium scan. 1 trk (track) shown in this figure indicates a region from which the disk device 20 reads data by executing the process once.

For example, upon receipt of a command when the disk device 20 makes the medium scan up to A (from the left of the medium 110), the disk device 20 suspends the medium scan. Upon completion of executing the command, the disk device 20 resumes the medium scan at A.

Or, upon receipt of the command when the disk device 20 executes the read process up to B (from the left of the medium 110), the disk device 20 suspends the medium scan after making the medium scan up to C. Then, the disk device 20 resumes the medium scan at C upon completion of executing the command.

Figure 12:
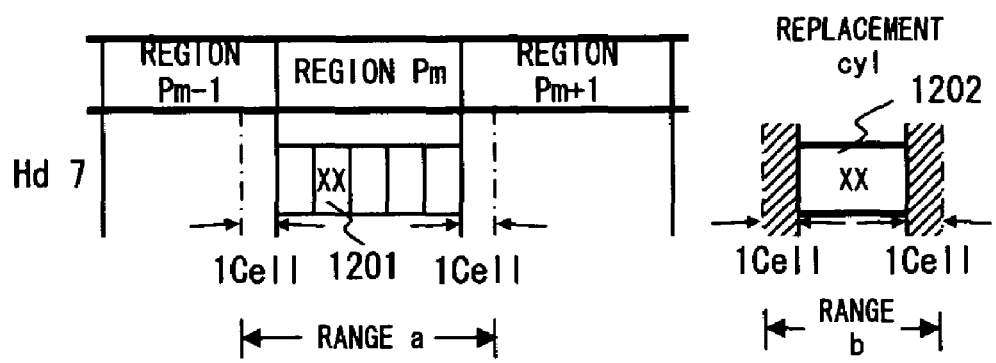
FIG. 12 is a schematic explaining a process executed when a replacement sector is included in a medium scan range.

FIG. 12 explains a process executed when a replacement sector is included in a medium scan range.

For example, in the case of the counter table 60 shown in FIG. 8, the region Pm and the regions of 1 cell, which precedes and succeeds the region Pm, are a medium scan range. If a process for replacing with a replacement cylinder 1202 is executed because a sector in this range is a defective sector 1201, the medium scan is made for the region Pm and the regions of 1 cell preceding and succeeding the region Pm (a range a shown in this figure), and the replacement cylinder 1202 and regions of 1 cell preceding and succeeding the cylinder 1202 (a range b shown in this figure) as medium scan ranges.

Figure 13:
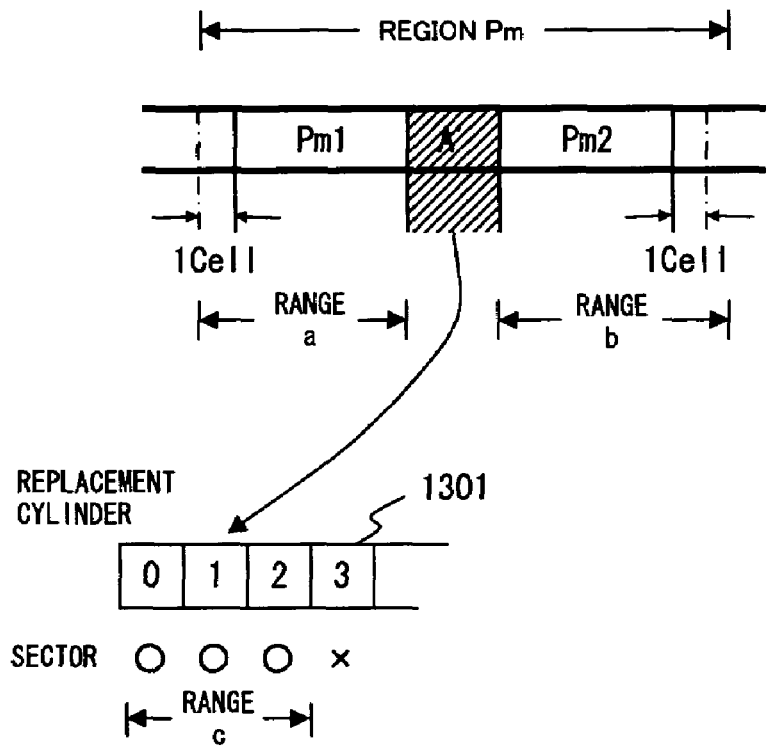
FIG. 13 is a schematic explaining a process executed when a replacement cylinder is included in a medium scan range.

FIG. 13 is a schematic explaining a process executed when a replacement cylinder is included in a medium scan range.

For example, in the case of the counter table 60 shown in FIG. 8, the region Pm (a region obtained by merging Pm1, a region A and Pm2), and regions of 1 cell preceding and succeeding the region Pm are defined to be a medium scan range. If the region A is allocated to sectors 0 to 2 of a replacement cylinder 1301, the medium scan is made first for the region Pm1 and Pm2, and the regions of 1 cell preceding and succeeding the region Pm (the medium scan is made for ranges a and b shown in FIG. 13). Then, the medium scan is made for the sectors 0 to 2 of the replacement cylinder 1301 to which the region A is allocated (the medium scan is made for a range c shown in FIG. 13).

Figure 14:
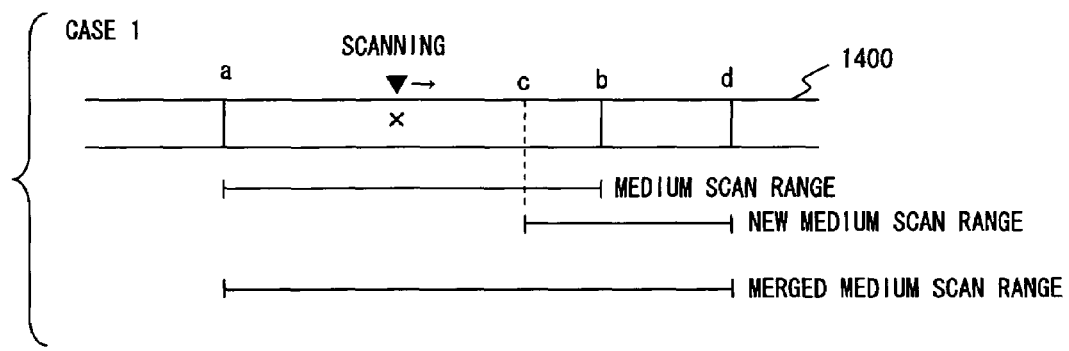
FIG. 14 is a schematic explaining a process executed when a medium scan range is changed during medium scan according to the first preferred embodiment.

FIG. 14 is a schematic explaining a process executed when a medium scan range is changed during the medium scan according to the first preferred embodiment.

A medium scan range a to b indicates a medium scan range identified when the medium scan starts. A medium scan range c to d indicates a medium scan range for which the medium scan is newly required, for example, because the frequency of an access from the host computer 24 increases during the medium scan after the medium scan starts.

As shown in FIG. 14, if a region for which the medium scan is newly required occurs when the medium scan proceeds up to X of a medium 1400, the disk device 20 continues the medium scan by recognizing a range obtained by adding (or merging) the newly occurred medium scan range c to d to the medium scan range a to b at the start of the medium scan.

As described above, the disk device 20 according to the first preferred embodiment segments the storage region of the magnetic disk 21 into small partitions, and manages an access for each head in each of the partitions by using the counter table 60. Additionally, the medium scan is made for a region the counter value of which exceeds a threshold value, whereby the medium scan can be accurately made for a region for which the medium scan is required, such as a region on which an access (write process) from the host computer 24 concentrates.

Additionally, the disk device 20 continually checks the counter table 60 at predetermined time intervals, thereby immediately making the medium scan upon detection of a counter value which exceeds a threshold value.

Namely, the disk device 20 according to the first preferred embodiment produces the effect of being able to make the medium scan for a suitable region at suitable timing. As a result, accuracy for preventing a read error from occurring beforehand is improved, and the number of scenes where a sector must be replaced by detecting a restorable read error at the time of executing a command can be decreased. Therefore, the medium scan can be made for a required minimum of regions.

(2) Second Preferred Embodiment

The second preferred embodiment according to the present invention is described below with reference to FIGS. 15 to 17.

Figure 15:
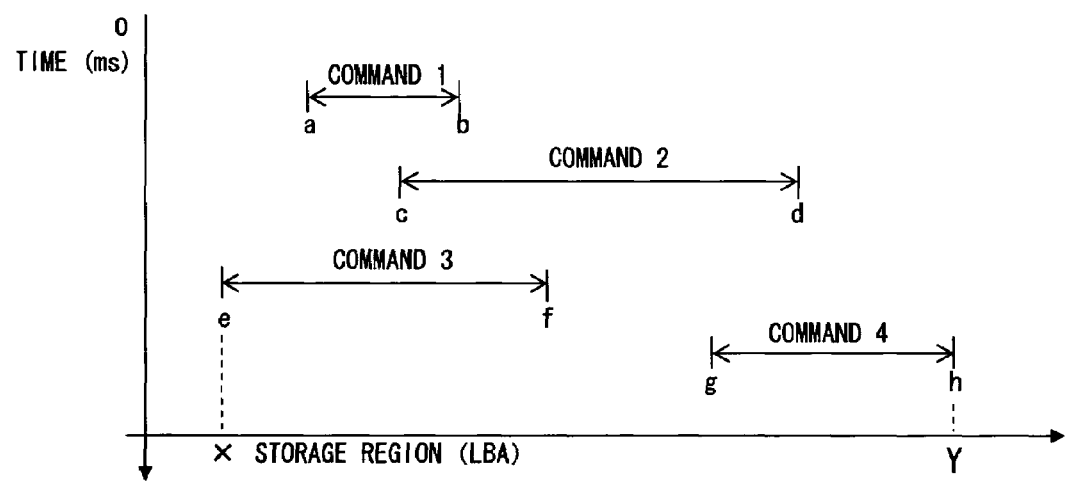
FIG. 15 is a schematic explaining a process with which a disk device according to a second preferred embodiment monitors the state of an access from a host computer.

FIG. 15 is a schematic explaining a process, which is executed by the disk device 20 according to the second preferred embodiment, for monitoring the state of an access from the host computer to the magnetic disk 21.

The disk device 20 stores, for example, in the RAM 27, the first LBA and the last LBA of a range for which the write process is executed according to a command received from the host computer 24 in order to monitor an access range. The first and the last LBAs are called a range counter hereinafter. In this preferred embodiment, a region including all of regions for which the write process has been executed is stored in the range counter.

For example, when a command 1 to write data to a region a to b is executed, the disk device 20 stores (a, b) in the RAM 27 as (first LBA, last LBA). When a command 2 to write data to a region c to d is executed next, the disk device 20 updates (first LBA, last LBA) to (a, d) because a<c<b<d.

When a command 3 to write data to a region e to f is further executed, the disk device 20 updates (first LBA, last LBA) to (e, d) because e<a<f<d. When a command 4 to write data to a region g to h is executed, the disk device 20 updates (first LBA, last LBA) to (e, h) because e<g<d<h.

In this way, the access range, namely, the range of the write process to the magnetic disk 21, which is executed by the disk device 20, is monitored.

Figure 16:
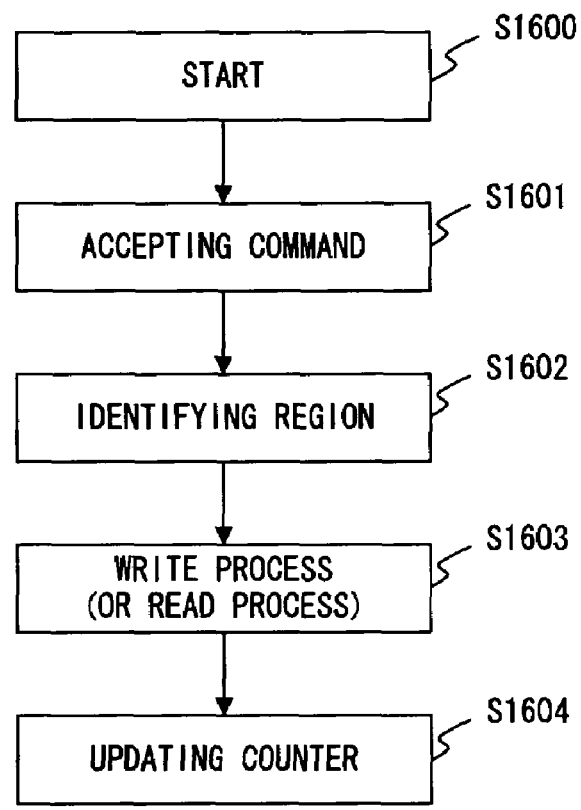
FIG. 16 is a flowchart showing a write process to a magnetic disk, according to the second preferred embodiment.

FIG. 16 is a flowchart showing a write process to the magnetic disk 21, according to the second preferred embodiment.

In step S1600, when starting to monitor an access from the host computer 24 to the disk device 20, the disk device 20 activates a timer and records an elapsed time.

In step S1601, upon acceptance of a command from the host computer 24, the disk device 20 transfers the process to step S1602.

In step S1602, the disk device 20 identifies a region to/from which the command accepted in step S1601 writes/reads data. For example, the write command specifies a region to which data is to be written such as "WRITE (LBA of a region where a write starts) (the number of regional blocks to be written)", whereby a region to which data is to be written can be identified with (LBA of a region where a write starts) and (the number of regional blocks to be written).

In step S1603, the disk device 20 executes the data write/read process in accordance with the command accepted in step S1601. Upon completion of executing the command, the disk device 20 transfers the process to step S1604.

In step S1604, the disk device 20 checks whether or not the command accepted in step S1601 is a command for commanding the write process to the magnetic disk 21.

If this command is for commanding the write process to the magnetic disk 21, the disk device 20 refers to, for example, the RAM 27, and updates the range counter as described with reference to FIG. 15. Additionally, the disk device 20 updates a command counter which counts (increments) the number of times that the command is executed.

In this preferred embodiment, the process in step S1604 (access monitoring process) is executed for the command which executes the write process to the magnetic disk 21 in order to monitor an access from the host computer 24 to the magnetic disk 21. However, a command for which the process in step S1604 is to be executed may be determined on demand.

Figure 17:
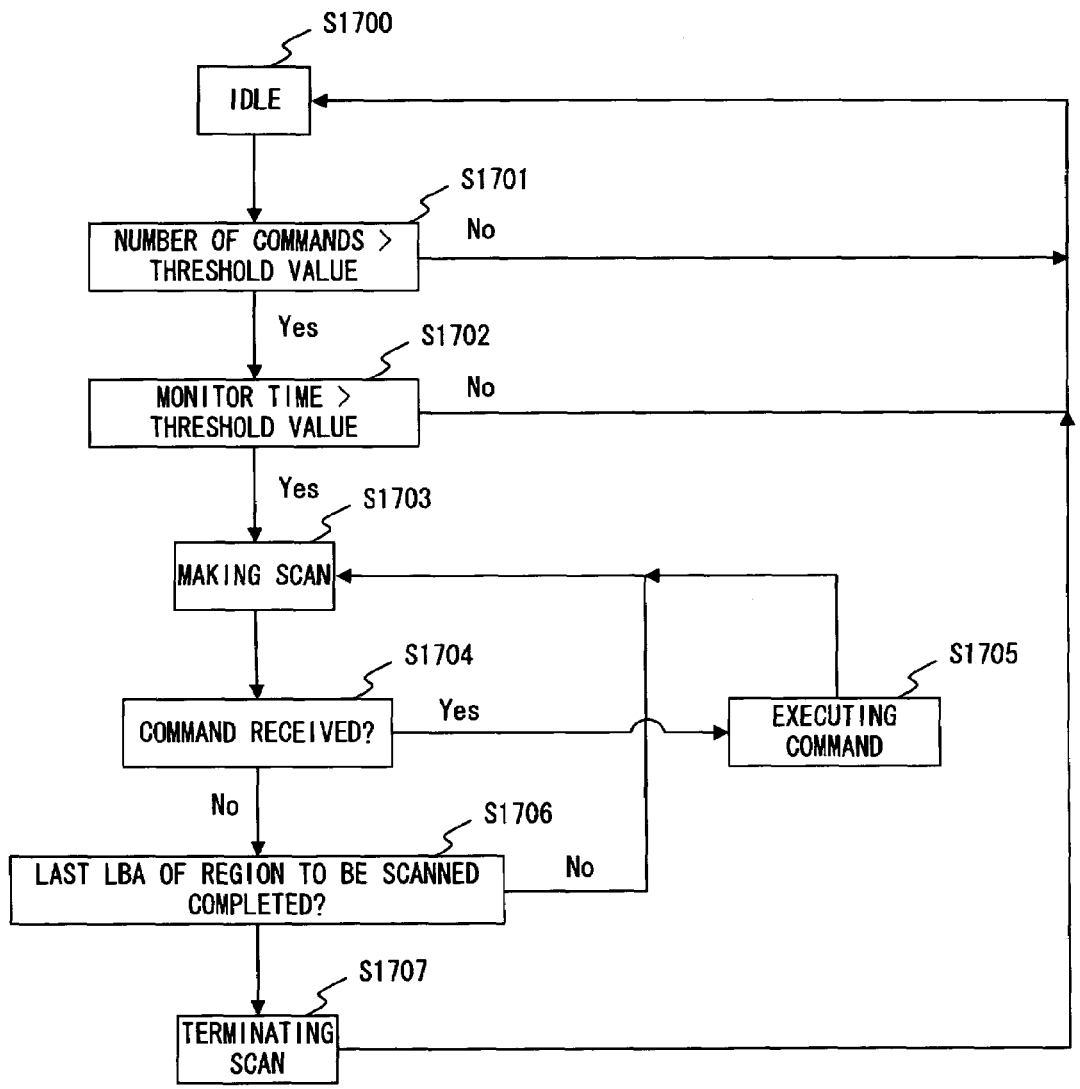
FIG. 17 is a flowchart showing a medium scan process according to the second preferred embodiment.

FIG. 17 is a flowchart showing a medium scan process according to the second preferred embodiment.

If no request is made from the host computer 24, the disk device 20 enters an idle state (step S1700). In this state, the disk device 20 executes no process for the magnetic disk 21. When a predetermined time period elapses after the disk device 20 enters the idle state, the disk device 20 transfers the process to step S1701.

In step S1701, the disk device 20 refers to the command counter stored in the RAM 27. Then, the disk device 20 obtains the number of times that the command is executed (hereinafter referred to as the number of commands), and makes a comparison with a threshold value (for example, 10 times). If the number of commands is equal to or smaller than the threshold value as a result of the comparison, the disk device 20 transfers the process to step S1700.

Or, if the number of commands is larger than the threshold value as a result of the comparison made in step S1701, the disk device 20 transfers the process to step S1702.

In step S1702, the disk device 20 refers to the elapsed time of the timer activated in step S1600 of FIG. 16. Then, the disk device 20 obtains the elapsed time from when the access monitoring starts (hereinafter referred to as monitor time).

Additionally, the disk device 20 makes a comparison between the monitor time and a threshold value (for example, 30 minutes). If the monitor time is equal to or smaller than the threshold value as a result of the comparison, the disk device 20 transfers the process to step S1700. Or, if the monitor time is larger than the threshold value as a result of the comparison made in step S1702, the disk device 20 transfers the process to step S1703.

After transferring the process to step S1703, the disk device 20 refers to the range counter stored in the RAM 27. Then, the disk device 20 obtains the first and the last LBAs of a region for which the medium scan is to be made, and makes the medium scan for that region.

In step S1703, upon acceptance of a request from the host computer 24 during the medium scan made by the disk device 20, the disk device 20 suspends the medium scan, and transfers the process to step S1704.

In step S1704, the disk device 20 determines whether or not a command (such as the READ command or the like) is received from the host computer 24. If the command is received, the disk device 20 transfers the process to step S1705, in which the disk device 20 executes the command.

Upon completion of executing the command, the disk device 20 transfers the process to step S1703, in which the disk device 20 resumes the suspended medium scan.

If the command is not received in step S1704, the disk device 20 transfers the process to step S1706. Then, the disk device 20 checks whether or not the medium scan is complete up to the last LBA of the current region obtained in step S1703.

If the medium scan is not complete up to the last LBA of the current region, the disk device 20 transfers the process to step S1703. Then, the disk device 20 resumes the suspended medium scan.

Or, if the medium scan is complete up to the last LBA of the current region in step S1706, the disk device 20 transfers the process to step 1707 and terminates the medium scan for the current region. Then, the disk device 20 transfers the process to step S1700.

The above described medium scan process refers to the case where both the process in step S1701 (comparison of the number of commands) and the process in step S1702 (comparison of monitor time) are executed. However, at least either of the processes in steps S1701 and S1702 may be executed.

Also in the second preferred embodiment, the medium scan is made with processes similar to those shown in FIGS. 10 through 14.

As described above, the disk device 20 according to the second preferred embodiment monitors the maximum range of a region to which the write process to the magnetic disk 21 is executed, and makes the medium scan if the number of commands or the monitor time exceeds a corresponding threshold value (if the frequency of an access from the host computer 24 to the magnetic disk 21 exceeds the threshold value). Therefore, the disk device 20 produces the effect that the medium scan can be made for a suitable region at suitable timing, in a similar manner as in the first preferred embodiment.

In addition to an effect similar to that in the first preferred embodiment, the disk device 20 produces the effect that the medium scan according to the second preferred embodiment can be easily implemented in the disk device 20 since the logical configuration of the medium scan is simpler than that according to the first preferred embodiment.

What is claimed is:

1. A disk device, which executes a write process for writing to a storage medium information transmitted from an upper device by request from the upper device, comprising:
   a medium monitoring unit for monitoring the number of times of the write process to the storage medium to which the information is written by the write process;
   a medium scan determining unit for determining whether or not to require medium scan for an area which contains a plurality of partitions into which the storage medium is segmented, according to the state of the storage medium; and
   a medium scan unit for making the medium scan for the area that said medium scan determining unit determines to require the medium scan,
   wherein said medium monitoring unit counts the number of times of the write process from the upper device to the storage medium for each of a predetermined number of partitions into which the storage medium is segmented; and
   further wherein said medium scan determining unit determines a partition, the write process number of times to which is larger than a predetermined number of times, to be a target of the medium scan.

2. The disk device according to claim 1, wherein said medium scan determining unit determines a partition, the write process number of times to which is larger than the predetermined number of times, and a predetermined region contiguous to the partition to be a target of the medium scan.

3. A disk device, which executes a write process for writing to a storage medium information transmitted from an upper device by request from the upper device, comprising:
   a medium monitoring unit for monitoring the number of times of the write process to the storage medium to which the information is written by the write process;
   a medium scan determining unit for determining whether or not to require medium scan for an area which contains a plurality of partitions into which the storage medium is segmented, according to the state of the storage medium; and
   a medium scan unit for making the medium scan for the area that said medium scan determining unit determines to require the medium scan,
   wherein said medium monitoring unit updates an access range including a region to which the write process is executed and counts the number of times of the write process, each time the write process to the storage medium is executed; and
   further wherein said medium scan determining unit determines the access range to be a target of the medium scan if the number of times of the write process is larger than a predetermined number of times.

4. The disk device according to claim 3, wherein said medium scan determining unit determines a region of the access range and a predetermined region contiguous to the access range to be a target of the medium scan.

5. A disk device, which executes a write process for writing to a storage medium information transmitted from an upper device by request from the upper device, comprising:
   a medium monitoring unit for monitoring the number of times of the write process to the storage medium to which the information is written by the write process;
   a medium scan determining unit for determining whether or not to require medium scan for an area which contains a plurality of partitions into which the storage medium is segmented, according to the state of the storage medium; and
   a medium scan unit for making the medium scan for the area that said medium scan determining unit determines to require the medium scan,
   wherein said medium monitoring unit updates an access range including a region to which the write process is executed and measures an elapsed time from when access monitoring starts, each time the write process to the storage medium is executed; and
   further wherein said medium scan determining unit determines a medium scan range to be a target of the medium scan if the elapsed time exceeds a predetermined time.

6. The disk device according to claim 5, wherein said medium scan determining unit determines a region of the access range and a predetermined region contiguous to the access range to be a target of the medium scan.

7. A medium scan method for use in a disk device, which executes a write process for writing to a storage medium information transmitted from an upper device by request from the upper device, comprising:
   causing the disk device to execute a medium monitoring process for monitoring the number of times of the write process to the storage medium to which the information is written by the write process;
   causing the disk device to execute a medium scan determining process for determining whether or not to require medium scan for an area which contains a plurality of partitions into which the storage medium is segmented, according to the state of the storage medium; and
   causing the disk device to execute a medium scan process for making the medium scan for the area that the medium scan determining process determines to require the medium scan,
   wherein the medium monitoring process counts the number of times of the write process from the upper device to the storage medium for each of a predetermined number of partitions into which the storage medium is segmented; and
   further wherein the medium scan determining process determines a partition, the write process number of times to which is larger than a predetermined number of times, to be a target of the medium scan.

8. A medium scan method for use in a disk device, which executes a write process for writing to a storage medium information transmitted from an upper device by request from the upper device, comprising:
   causing the disk device to execute a medium monitoring process for monitoring the number of times of the write process to the storage medium to which the information is written by the write process;
   causing the disk device to execute a medium scan determining process for determining whether or not to require medium scan for an area which contains a plurality of partitions into which the storage medium is segmented, according to the state of the storage medium; and causing the disk device to execute a medium scan process for making the medium scan for the area that the medium scan determining process determines to require the medium scan, wherein the medium monitoring process updates an access range including a region to which the write process is executed and counts the number of times of the write process, each time the write process to the storage medium is executed; and further wherein the medium scan determining process determines the access range to be a target of the medium scan if the number of times of the write process to the storage medium is larger than a predetermined number of times.

9. A medium scan method for use in a disk device, which executes a write process for writing to a storage medium information transmitted from an upper device by request from the upper device, comprising:

causing the disk device to execute a medium monitoring process for monitoring the number of times of the write process to the storage medium to which the information is written by the write process;

causing the disk device to execute a medium scan determining process for determining whether or not to require medium scan for an area which contains a plurality of partitions into which the storage medium is segmented, according to the state of the storage medium; and causing the disk device to execute a medium scan process for making the medium scan for the area that the medium scan determining process determines to require the medium scan, wherein the medium monitoring process updates an access range including a region to which the write process is executed and measures an elapsed time from when access monitoring starts, each time the write process to the storage medium is executed; and further wherein the medium scan determining process determines the access range to be a target of the medium scan if the elapsed time exceeds a predetermined time.

10. A scan controller, comprising:

a medium monitoring unit for monitoring the number of times of a write process to a storage medium to which information is written by a write process for writing to the storage medium the information transmitted from an upper device by request from the upper device;

a medium scan determining unit for determining whether or not to require medium scan for an area which contains a plurality of partitions into which the storage medium is segmented, according to the state of the storage medium; and a medium scan unit for making the medium scan for the area that said medium scan determining unit determines to require the medium scan, wherein said medium monitoring unit counts the number of times of the write process from the upper device to the storage medium for each of a predetermined number of partitions into which the storage medium is segmented; and further wherein said medium scan determining unit determines a partition, the write process number of times to which is larger than a predetermined number of times, to be a target of the medium scan.

11. The scan controller according to claim 10, wherein said medium scan determining unit determines a partition whose the write process number of times to which is larger than the predetermined number of times, and a predetermined region contiguous to the partition to be a target of the medium scan.

12. A scan controller, comprising:

a medium monitoring unit for monitoring the number of times of a write process to a storage medium to which information is written by a write process for writing to the storage medium the information transmitted from an upper device by request from the upper device;

a medium scan determining unit for determining whether or not to require medium scan for an area which contains a plurality of partitions into which the storage medium is segmented, according to the state of the storage medium; and a medium scan unit for making the medium scan for the area that said medium scan determining unit determines to require the medium scan, wherein said medium monitoring unit updates an access range including a region to which the write process is executed and counts the number of times of the write process, each time the write process to the storage medium is executed; and further wherein said medium scan determining unit determines the access range to be a target of the medium scan if the number of times of the write process to the storage medium is larger than a predetermined number of times.

13. The scan controller according to claim 12, wherein said medium scan determining unit determines a region of the access range and a predetermined region contiguous to the access range to be a target of the medium scan.

14. A scan controller, comprising:

a medium monitoring unit for monitoring the number of times of a write process to a storage medium to which information is written by a write process for writing to the storage medium the information transmitted from an upper device by request from the upper device;

a medium scan determining unit for determining whether or not to require medium scan for an area which contains a plurality of partitions into which the storage medium is segmented, according to the state of the storage medium; and a medium scan unit for making the medium scan for the area that said medium scan determining unit determines to require the medium scan, wherein said medium monitoring unit updates an access range including a region to which the write process is executed and measures an elapsed time from when access monitoring starts, each time the write process to the storage medium is executed; and further wherein said medium scan determining unit determines a medium scan range to be a target of the medium scan if the elapsed time exceeds a predetermined time.

15. The scan controller according to claim 14, wherein said medium scan determining unit determines a region of the access range and a predetermined region contiguous to the access range to be a target of the medium scan.

* * * * *